United States Patent [19]

Dobberpuhl

[11] Patent Number: 5,029,437
[45] Date of Patent: Jul. 9, 1991

[54] MOWER DECK OUTRIGGER SUSPENSION
[75] Inventor: Dale R. Dobberpuhl, Horicon, Wis.
[73] Assignee: Deere & Company, Moline, Ill.
[21] Appl. No.: 555,971
[22] Filed: Jul. 19, 1990
[51] Int. Cl.$^5$ ............... A01D 34/66; A01B 59/041
[52] U.S. Cl. ................................. 56/15.8; 56/15.9; 56/DIG. 22; 172/450
[58] Field of Search ............... 56/6, 15.7, 15.8, 15.9, 56/15.2, 14.9, DIG. 10, DIG. 14, DIG. 22; 172/439, 450

[56] References Cited

U.S. PATENT DOCUMENTS 3,402,536  9/1968  Hale et al. ................. 56/15.7 X
4,760,686  8/1988  Samejima et al. ............ 56/15.8

Primary Examiner—Ramon S. Britts
Assistant Examiner—David J. Bagnell

[57] ABSTRACT

A mechanism for coupling a mower deck to a powered vehicle and having push arms pivotally connected to the vehicle between the front wheels of the vehicle and coupled to the front portion of the deck for pushing the deck in front of the vehicle. A member or outrigger extends outwardly from the rear of one of the push arms and supports a rear side portion of the deck and thereby establishes a pivot point for the deck outwardly from the rear of the push arm such that as the opposite side of the deck rides over a bump in the ground the side of the deck carried by the member or outrigger will not dip an undesirable amount.

8 Claims, 3 Drawing Sheets

MOWER DECK OUTRIGGER SUSPENSION

BACKGROUND OF THE INVENTION

1. Field of the Invention

This invention relates to mechanisms for coupling mower decks to powered vehicles.

2. Description of the Related Art

Many conventional mowers provide a powered vehicle for pushing a mower deck in front of the vehicle for the cutting or mowing of vegetation. Decks are typically coupled with the vehicle via a pair of push arms that extend from the top of the mower deck and connect with the vehicle between the vehicle's two front driven wheels. Large caster wheels are mounted to the front of these decks to support the front portion of the deck above the ground. Conventional push arms are not rigidly fixed to the vehicle, but rather have pin connections with both the deck and the vehicle in order to allow the decks to ride over irregularities in ground conditions. Each push arm can pivot about its connection to the vehicle independent of the other push arm to allow one side of the deck to ride over an irregularity in the ground conditions such as a bump. Therefore, these decks can swing about a plurality of axes parallel with a line defined by the direction of travel.

Many conventional mowers provide decks that are significantly wider than the arrangement of the push arms. Decks that are wider than the push arms and wheel base are advantageous during trimming operations and also act to decrease the size of any uncut circle of grass remaining when the vehicle executes a tight corner. The rear portions of these decks are supported above the ground by connections with the rear portions of the push arms near the center of the vehicle.

As one of the deck's front caster wheels encounters a bump, the caster wheel and the side of the deck on which the caster wheel is mounted will ride up and over the bump. The deck thereby pivots about the other side of the deck's connection with the rear of the push arm. The outer edge of the deck on the side which does not encounter the bump is thereby caused to dip down toward the ground. As the edge of the deck dips down toward the ground, the grass is caused to be cut unevenly. The amount that the edge of the deck will dip is even greater for the wider decks, since the edges of the wide decks extend farther outwardly from the point of connection with the rear of the push arm than do the narrower decks. Therefore, many conventional mechanisms for coupling a deck to a powered vehicle allow the edge of the deck to dip an unacceptable amount, resulting in an uneven cut, and even gouging of the ground.

Some conventional decks provide a gage wheel mounted near the rear outer edge of the deck to prevent the deck and blades from gouging the ground. When operating on level ground these wheels are suspended above the ground. When uneven conditions are encountered the wheels engage the ground as the edge of the deck dips toward the ground and thereby prevent the deck and blades from striking the ground. However, these wheels allow the edge of the deck to dip until the wheel engages the ground. Therefore, the deck is allowed to cut the grass unevenly as the deck dips. It would be possible to fix wheels to the rear of the deck for constant engagement with the ground to thereby establish a point, laterally spaced from the push arm, about which the deck pivots when uneven ground conditions are encountered. Since these wheels would constantly engage the ground, they would have to be larger and more sturdy than the gage wheels that do not constantly engage the ground. It would therefore be costly to mount such a wheel to the rear of the deck for constantly rolling over the ground.

It would therefore be advantageous to provide a mechanism for pushing a mower deck in front of a powered vehicle such that when one side of the deck rises up over a bump in the ground, the corresponding lowering or dipping of the other side of the deck would be reduced. It would be desirable for such a mower to provide for a reduction in the amount of unevenly cut grass and gouging of the ground associated with the dipping of the side of the deck, while not significantly increasing the expense of manufacture for such a deck.

SUMMARY OF THE INVENTION

The present invention provides a mechanism for coupling a mower deck with a powered vehicle. Push arms extend forwardly from between the powered vehicle's front driven wheels and are connected with the deck to push the deck during mowing operation. The front portion of the arms are coupled by a universal or ball joint with a front frame structure that is carried by front ground engaging caster wheels. The front frame supports the front portion of the deck above the ground. The rear portion of the deck is supported by the rear portion of the push arms. A member or outrigger extends laterally outwardly from the push arm and carries the rear portion of the deck above the ground via a lost motion connection. As the front caster wheel on the side of the deck opposite the member engages bumps in the ground conditions the deck is caused to pivot about its connection with the member. The side edge of the deck adjacent the member dips toward the ground. However, since the axis of pivoting of the deck is spaced laterally outwardly from the push arm, the amount of dip will be less than if the deck were coupled directly with the push arm. Scalping of the grass being cut and gouging of the ground is thereby reduced. Furthermore, the member is less costly than a wheel at the edge of the deck sturdy enough to withstand constant contact with the ground.

Therefore, the present invention provides a mechanism for reducing the amount of dip on one side of the deck that occurs when the other side of the deck encounters an irregularity or bump in the ground conditions. Vegetation is thereby cut much more evenly and gouging of the ground occurs less frequently without having to provide a wheel at the rear outer edge of the deck for constantly engaging the ground.

DESCRIPTION OF THE PREFERRED EMBODIMENT

References made in the following description to left and right are made with respect to the forward direction of travel of the vehicle.

Figure 1:
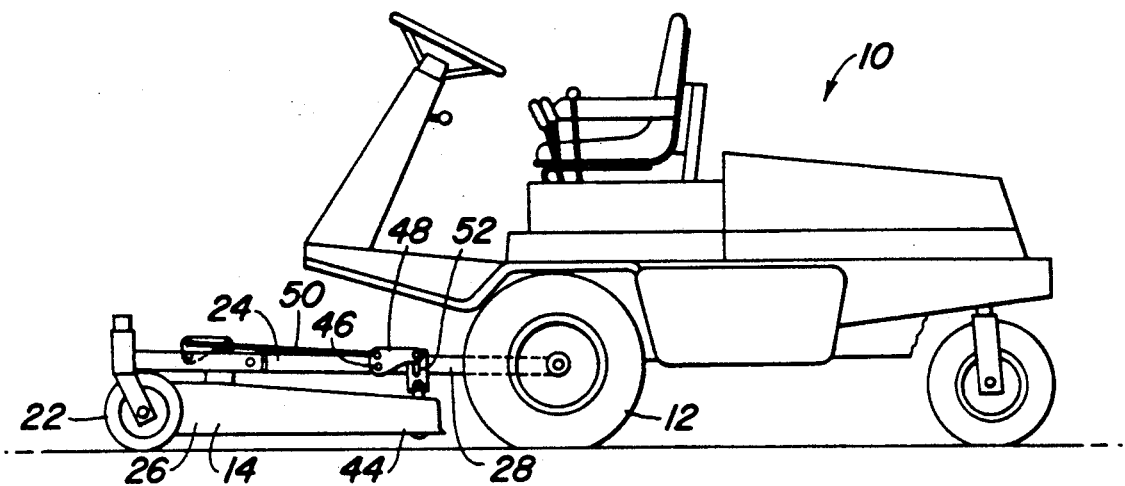
FIG. 1 is a side view of the present invention connecting a mower deck to a powered vehicle.
Figure 2:
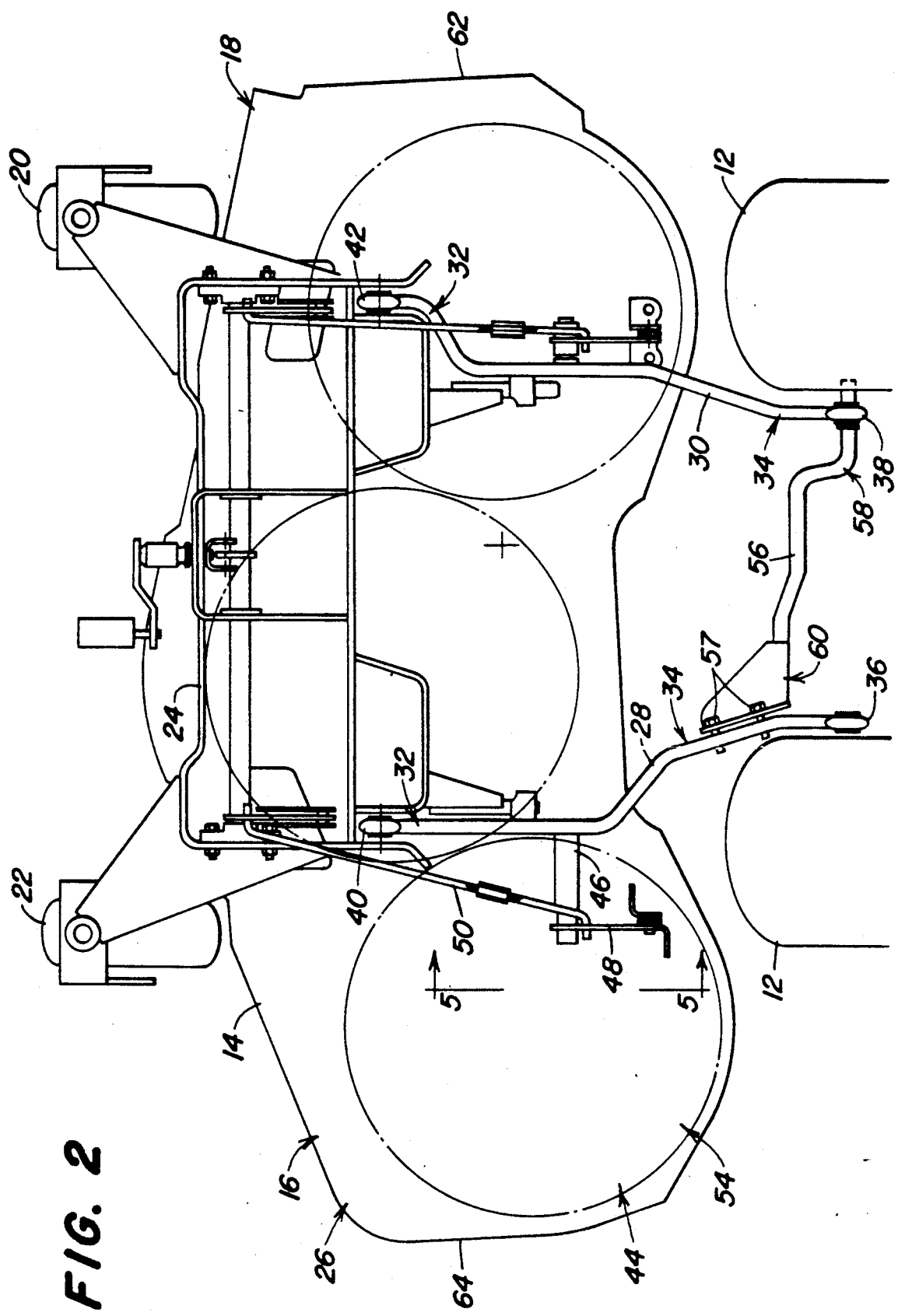
FIG. 2 is a top view of a mower deck having the present invention.

Referring now to FIG. 1, there is shown the preferred embodiment of the present invention. A powered vehicle 10 having front ground engaging driven wheels 12 pushes a mower deck 14 having left and right sides 16, 18, as seen in FIG. 2. Right and left front caster wheels 20, 22 are coupled with a front frame 24 for supporting the deck's front portion 26 above the ground. First and second push arms, or left and right push arms 28, 30 as shown in FIG. 2, with front and rear portions 32, 34, couple the deck 14 with the powered vehicle 10. The rear portion 34 of each push arm 28, 30 is connected with the powered vehicle 10 between the driven front wheels 12 by left and right rear ball joints 36, 38 which allow pivoting about the joint in all directions. The front portions 32 of the push arms 28, 30 are connected to the front frame 24 by left and right front ball joints 40, 42. The front ball joints 40, 42 allow the deck 14 to pivot about a horizontal axis defined by a line passing through both front ball joints 40, 42. The front ball joints 40, 42 also allow the deck 14 to pivot about a horizontal axis parallel to the direction of travel, such that each side of the deck 14 can rise up and over irregularities in ground conditions. The prefered embodiment contains ball joints, but other types of connections allowing for pivoting in all directions may be used with the present invention.

Figure 5:
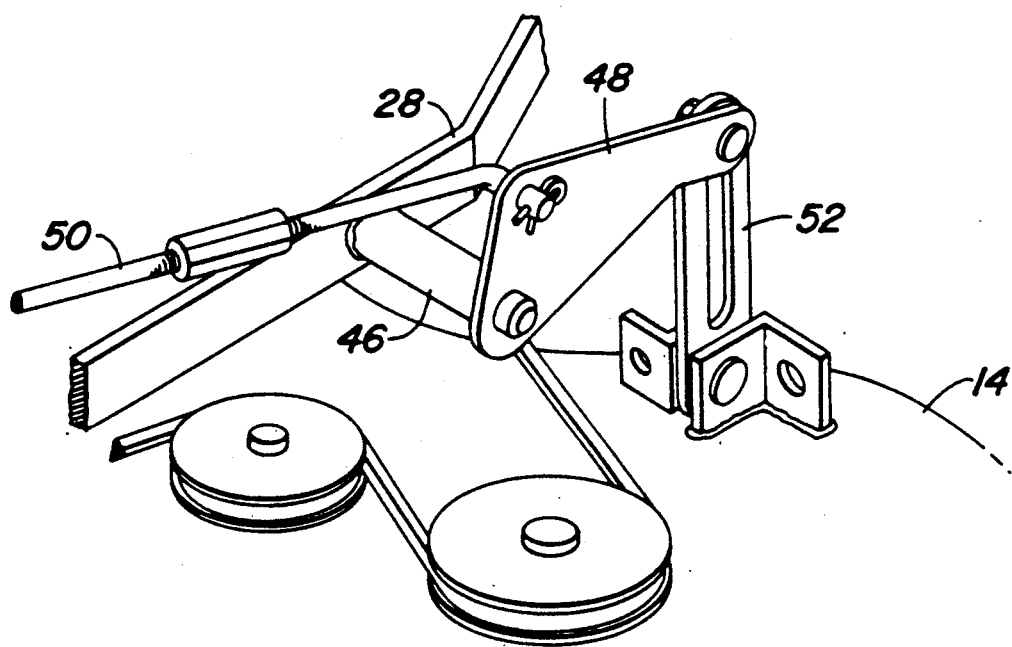
FIG. 5 is a partial perspective view showing the left rear portion of the deck connected to the left push arm via the outrigger.

The deck's rear portion 44 is supported by connections with the rear portion 34 of the push arms 28, 30. The left push arm 28 has mounted thereon a member or outrigger 46 that extends laterally outwardly from the push arm 28. A bell crank 48 is swingably mounted to the left end portion of the member 46 and is coupled by a rod 50 with the front frame 24 for adjusting the height of the deck 14 between periods of operation. Therefore, the bell crank 48 serves to adjust the height of the rear portion 44 of the deck 14 as the front portion 26 of the deck 14 is adjusted by the operator. No additional height adjustment is required by the operator at the connection between the member 46 and deck 14. A lost motion mechanism or slotted link 52, as shown in FIGS. 1 and 5, is coupled between the bell crank 48 and the rear left portion 54 of the deck 14 to allow that portion of the deck 14 to easily ride up and over bumps in the ground conditions.

The preferred embodiment provides a sway bar 56, as seen in FIG. 2 that includes a plate 60 which is rigidly fixed via bolts 57 to the left push arm 28. The sway bar 56 is pivotally coupled at its right portion 58 with the vehicle 10. More specifically, the right portion 58 passes through the right rear ball joint 38 for pivotal movement independent of the right push arm 30. The sway bar 56 thereby pivots u and down with the left push arm 28 and about the connection with the right rear ball joint 38. The sway bar 56 serves to prevent the left push arm 28 from swinging about its longitudinal axis under the weight of the deck 14 on the member 46 Without a sway bar 56, the left push arm 28 would twist about its connection with the left rear ball joint 36 since the ball joint 36 will not restrict motion in any direction. Without a sway bar 56 the member 46 would be allowed to swing downwardly under the weight of the left rear portion 54 of the deck 14. The sway bar 56 thereby keeps the member 46 and left rear portion 54 of the deck 14 from continuously dipping downwardly under the weight of the deck 14. Since the sway bar 56 pivots with the left push arm 28, the sway bar 56 acts to prevent twisting of the left push arm 28 throughout the entire range of motion of the left push arm 28.

Next, the operation of the invention will be discussed. The push arms 28, 30 are coupled to the vehicle 10 by rear ball joints 36, 38 which allow the push arms 28, 30, and therefore the entire deck 14, to pivot about an axis defined by a line passing through the two rear ball joints 36, 38. This allows the entire deck 14 to ride over bumps and ground obstructions before the vehicle 10 encounters the bumps. The resulting cut is therefore more even than if the deck 14 were rigidly connected with the vehicle 10.

Figure 3:
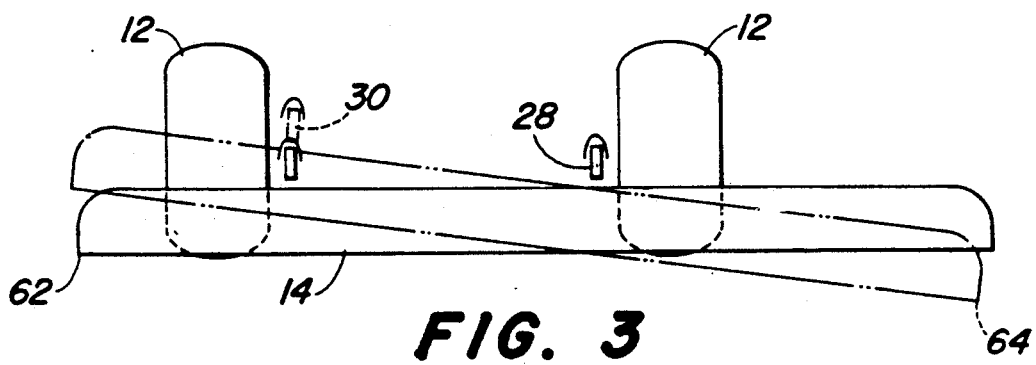
FIG. 3 is a schematic front view of a conventional deck as the right front caster wheel encounters a bump in the ground conditions.

The deck 14 is also adapted for tilting from side to side to allow one side of the deck 14 to ride up and over a bump without lifting the other side off of the ground. The deck 14 is therefore able to pivot about axes parallel with the direction of travel. When, for example, the right side 18 of the deck 14 encounters a bump and the left side 16 does not, the right front caster wheel 20 will ride up and over the bump and the front frame 24 will tilt upwardly to the right. The tilting of the frame 24 causes the frame 24 to pivot about the left front ball joint 40 that connects the frame with the left push arm 28. The deck 14 will tilt upwardly to the right with the frame 24 to rise over the bump. Therefore, the right outer side edge 62 of the conventional deck 14, as shown in the schematic of FIG. 3, will rise up over the bump and the left outer side edge 64 will dip downwardly toward the ground. Many conventional mowers connect the rear portion 44 of the deck 14 with the rear portion 34 of the push arms 22, 24 near the center of the vehicle 10. Since the rear portion 44 of the deck 14 will pivot about this point, and the distance from this point and the left side edge 64 is great, the dipping of the left side edge 64 can be large, as seen in Prior Art FIG. 3. Also, since conventional mower decks 14 are often offset to the left of the vehicle's center to facilitate trimming operations, as illustrated in FIG. 3, the dipping of the left side portion 64 of the deck 14 is increased even more, resulting in an uneven cut, scalping of grass, and gouging of the ground by the blades and mower deck edge.

Figure 4:
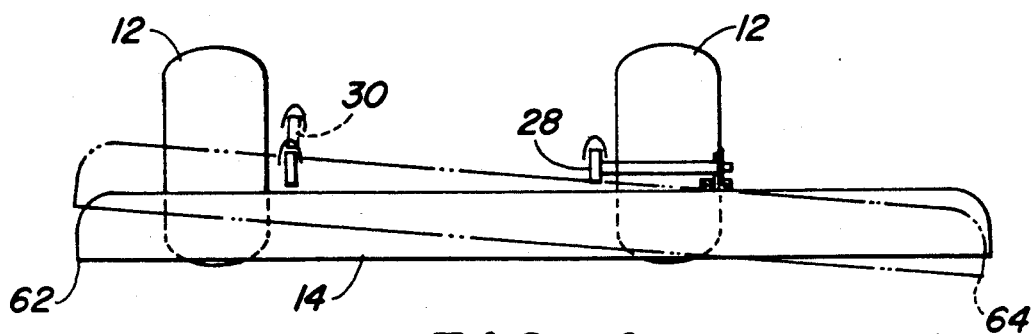
FIG. 4 is a schematic front view of the present invention as the right front caster wheel encounters a bump.

When the right side 18 of the present invention encounters a bump and the left side 16 does not, as shown in the schematic of FIG. 4, the right push arm 30 will pivot upwardly about the right rear ball joint 38 connected with the vehicle 10. The left push arm 28 will not pivot upwardly, but rather will remain stationary since the left side 16 of the deck 14 did not encounter a bump. The deck 14 will therefore tilt to one side by pivoting about its connection with the member 46 to allow the right side 18 to rise up and over the bump. The left side 16 of the deck 14 will dip downwardly as the deck 14 pivots. The outrigger or member 46 of the present invention establishes a point of pivot outwardly from the left push arm 28. Therefore, since the point of pivot of the rear portion 44 of the deck 14 is closer to the left outer side edge 64 of the deck 14 than conventional mowers, the amount of dip of the left side edge 64 is reduced.

During operation, the rear left portion 54 of the deck 14 is carried by the member 46 and left push arm 28. The weight of the deck 14 on the member 46 tends to urge the left edge of the member 46 downwardly and to pivot the left push arm 28. The left rear ball joint 36 does not prevent the left push arm 28 from twisting under the weight of the deck 14, and therefore would allow the left side portion 16 of the deck 14 to dip as the left push arm 28 is twisted. However, the sway bar 56 of the present invention revents the twisting of the left push arm 28 under the weight of the deck 14. The sway bar 56 is rigidly fixed to the left push arm 28 and is pivotally fixed to the vehicle 10. Since the sway bar 56 is coupled to the vehicle 10 at a point spaced from the left push arm's connection with the vehicle 10, the left push arm 28 is prevented from twisting under the weight of the deck 14. The pivotal connection of the sway bar 56 to the vehicle 10 allows the sway bar 56 to pivot with the left push arm 28. Therefore, the sway bar 56 acts to prevent twist throughout the entire range of pivoting of the left push arm 28.

I claim:

1. A mechanism, comprising:
   a powered vehicle having two front ground engaging wheels;
   a push arm having front and rear portions, said rear portion being pivotally coupled with the vehicle between said two front wheels for allowing vertical movement of the arm with respect to the vehicle;
   a mower deck within which vegetation can be cut, having opposite sides with respect to the direction of travel of the vehicle and having front and rear portions, said deck being coupled with said front portion of the push arm for being pushed ahead of the vehicle, each of said opposite sides being vertically movable with respect to the vehicle as the respective side of the deck encounters irregular ground conditions;
   ground engaging wheels supporting the front portion of the deck above the ground, and
   a member fixed with said push arm and extending laterally outwardly from the direction of travel to support one of said rear side portions of the deck above the ground, said member establishing a point spaced outwardly from the push arm and about which the deck pivots as the other side portion of the deck rises to ride over an irregularity in ground conditions.

2. The invention of claim 1, wherein
   the front portion of the push arm is coupled with the deck for pivotal motion in any direction;
   the rear portion of the push arm is coupled with the vehicle for pivotal motion in any direction, and
   a sway bar is pivotally coupled at one portion with the vehicle, and rigidly fixed at another portion with the push arm for preventing the push arm from swinging about its longitudinal axis under the force of the deck's weight that is transfered from the deck to the member to the push arm.

3. The invention of claim 2 wherein the front portion of the push arm is coupled with the deck by a ball joint and
   the rear portion of the push arm is coupled with the vehicle by a ball joint.

4. The invention of claim 2, further comprising
   a bell crank coupled with the member and
   a lost motion coupling between the bell crank and the rear portion of the deck.

5. The invention of claim 1, further comprising
   a bell crank coupled with the member and
   a lost motion coupling between the bell crank and the rear portion of the deck.

6. A mechanism for coupling a mower deck with a powered vehicle having two front ground engaging wheels, said mechanism comprising:
   a push arm having front and rear portions, said rear portion being coupled with the vehicle between said two front wheels for pivoting with respect to the vehicle in a vertical plane;
   a mower deck within which vegetation can be cut, having opposite sides with respect to the direction of travel of the vehicle and having front and rear portions, said deck being coupled with said front portion of the push arm for being pushed ahead of the vehicle, each of said opposite sides being vertically movable with respect to the vehicle as the respective side of the deck encounters irregular ground conditions;
   ground engaging wheels for supporting the front portion of the deck above the ground, and
   a member fixed with said push arm and extending laterally outwardly from the direction of travel to support one of said rear side portions of the deck above the ground, said member establishing a point about which the deck pivots as the opposite side portion of the deck rises to ride over an irregularity in the ground.

7. A mechanism for coupling a mower deck to a powered vehicle having two front ground engaging wheels, said mechanism comprising:
   first and second push arms each having front and rear portions, said rear portions each being coupled with the vehicle between said two front wheels for pivoting with respect to the vehicle in a vertical plane and independent of the other push arm;
   a mower deck within which vegetation can be cut by a blade supported by the deck, the deck having first and second side portions each having front and rear portions, each of said sides being coupled with the front portion of a respective push arm for being pushed ahead of the vehicle, said deck being tiltable from side to side as the deck encounters irregular ground conditions;
   ground engaging wheels supporting the front portion of the deck above the ground, and
   a member fixed with said first push arm and extending laterally outwardly from the direction of travel to support the rear portion of the first side portion of the deck above the ground, said member defining a point about which the deck pivots as the second side portion of the deck rises to ride over an irregularity in the ground.

8. The invention as defined in claim 7, wherein
   the front portion of the push arms are coupled with the deck by ball joints;
   the rear portion of the push arms are respectively coupled with the vehicle by ball joints, and
   a sway bar is rigidly fixed with the first push arm and swingably coupled with the vehicle for preventing the first push arm from swinging about its longitudinal axis under the force exerted on the member by the weight of the deck.

* * * * *